United States Patent [19]

Pyötsiä et al.

[11] Patent Number: 4,691,894
[45] Date of Patent: Sep. 8, 1987

[54] VALVE

[75] Inventors: Jousi K. Pyötsiä, Helsinki; Esko T. Yli-Koski, Kerava, both of Finland

[73] Assignee: Neles OY, Helsinki, Finland

[21] Appl. No.: 812,324

[22] Filed: Dec. 23, 1985

[30] Foreign Application Priority Data

Jan. 9, 1985 [FI] Finland ................... 850106

[51] Int. Cl.⁴ ............................................. F16K 47/08
[52] U.S. Cl. .................................... 251/127; 251/283; 251/305
[58] Field of Search ............... 251/118, 127, 281, 283, 251/305

[56] References Cited

U.S. PATENT DOCUMENTS

| | | | |
|---|---|---|---|
| 1,144,306 | 6/1915 | Mock | 251/127 X |
| 4,246,918 | 1/1981 | Dean | 251/283 X |
| 4,295,632 | 10/1981 | Engelke | 251/305 X |

FOREIGN PATENT DOCUMENTS

| | | | |
|---|---|---|---|
| 3226453 | 1/1984 | Fed. Rep. of Germany . | |
| 2234497 | 1/1975 | France | 251/305 |
| 602731 | 4/1978 | U.S.S.R. | 251/305 |

Primary Examiner—Robert G. Wilson
Attorney, Agent, or Firm—Cushman, Darby & Cushman

[57] ABSTRACT

Valve which consists of a body (1) provided with a flow passage, of a closing member (2), such as, e.g., a flap, fitted in the flow passage (3) pivotably or turnably and having no passage opening, and, if necessary, of jointly operative sealing members (6) fitted between the closing member (2) and the valve body (1). In the flow passage (3) in the valve body (1), after the closing member (2), at the outlet side of the flow, one or several attenuation member or members (9) are fitted, which are placed one after the other at a distance from each other and from the closing member (2), which the closing member is in the closed position, and which reduce the cross-sectional area of the flow passage (3). The attenuation member or members (9) may be provided with holes or openings (12) passing through them.

12 Claims, 11 Drawing Figures

FLOW →

FLOW →

VALVE

The present invention is concerned with a valve, which consists of a body provided with a through flow passage as well as of a closing member, such as a flap, fitted in the flow passage pivotably or turnably and having no passage opening, and, if necessary, of jointly operating sealing members fitted between the closing member and the valve body.

The object of the invention is to provide an attenuation of the dynamic moment and of noise in flap valves or in other valves provided with pivotable disc-shaped closing members with no flow passage opening in closing and control operation.

When a valve is in a partly open position, pressure losses arise in the valve and the flow of the medium is choked in the pipe system. As a result of the pressure loss, the pressure before the disturbance point, i.e. the valve, is higher than after the disturbance. In flap valves, the effect of the difference in pressure is not distributed uniformly over the area of the closing member or flap. At the face of the inlet side of the flap, near the edge that is turned towards the upstream flow, to be called inlet edge, within the area of the central diameter perpendicular to the pivot shaft, a so-called stagnation point is formed, at which the flow speed is zero. Within the area of the stagnation point, there is a pressure peak which is higher than the inlet pressure. When movement takes place on the face of the flap in the direction of the said central diameter towards the edge of the flap that is turned downstream, to be called trailing edge, the pressure applied to the face of the flap is reduced continuously when moving towards the trailing edge. The reduction in the pressure results from an increasing flow speed, and the pressure is already equal to the inlet pressure before the trailing edge. At the trailing edge, the pressure is lower than the pressure at the outlet side of the valve. On the face of the outlet side of the flap, the flow is detached from the flap, and the magnitude of the pressure corresponds to the nominal pressure at the outlet side.

The pressure distributions formed depend on the angle of opening of the flap and on the pressure as well as on the shape of the flap.

An uneven distribution of pressure results in a dynamic moment which attempts to close the valve. Normally the maximum value of the moment is reached within a range of 60° ... 80° of the opening angle of the flap, depending on the shape of the flap. An increase in pressure increases the moment almost linearly when the opening angle remains unchanged. Owing to the effect of the dynamic moment, only small flap valves are allowed to be controlled by means of lever operation; the valve may cause a situation of danger for the operator. The moment is also detrimental in regulating use, because its effect is at the maximum within the optimum range of control of the valve, and the required moment increases the size of the actuating device.

It is known in prior art to reduce the dynamic moment by shaping the flap. A solution has been to provide the face of the flap at the inlet side, after the stagnation point, with shapes that prevent an increase in the flow speed, or to shape the whole flap, e.g., as described in U.S. Pat. Nos. 3,442,489, 3,680,833, 3,770,242, 4,005,849, GB Pat. No. 1,588,703, DE Appl. 2,359,717, and Description of SU Invention 773,356. Another mode has been to shape the inlet edge and the trailing edge, e.g., U.S. Pat. Nos. 3,677,297, 3,960,177, and 4,036,469. It is also known in prior art to shift the maximum point of dynamic moment to an area outside the normal control area, e.g. to an opening angle larger than 80°.

In all the said inventions, attempts have been made to equalize the pressure distribution by means of the flap, whereby the dynamic forces are directed at the flap and strain the flap as well as its shafts and bearings.

By means of the construction in accordance with the present invention, this strain is reduced essentially by shifting the compensation for the dynamic forces onto the stationary body of the valve, whereby the actuating device and the members transmitting its moment to the closing member can be chosen in accordance with a reduced load. In regulating use, the reduced size of the actuating device improves the quality of adjustment, because the mass forces in the actuating device become lower.

The valve in accordance with the invention is mainly characterized in that in the flow passage in the valve body, at one side or both sides of the closing member, one or several attenuating plates are fitted, which are placed side by side at distances from each other and which are either perforated or provided with openings.

The invention comes out in more detail from the following description and from the accompanying drawings, wherein FIG. 1 is a sectional view of a flap valve provided with attenuation of the dynamic moment, viewed in the longitudinal direction of the pivot shaft of the closing member with the closing member partly opened, and FIG. 2 shows the valve of FIG. 1 when the closing member has been pivoted into the position closing the flow passage in the valve.

Figure 1:
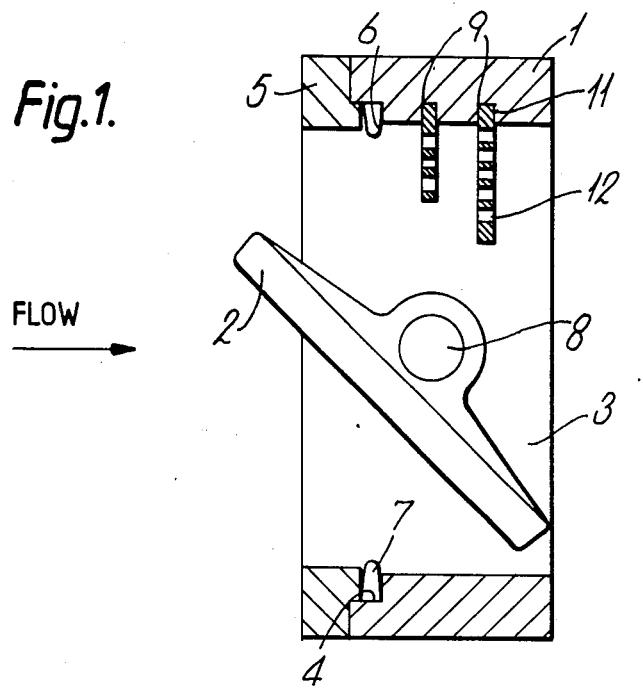
Figure 2:
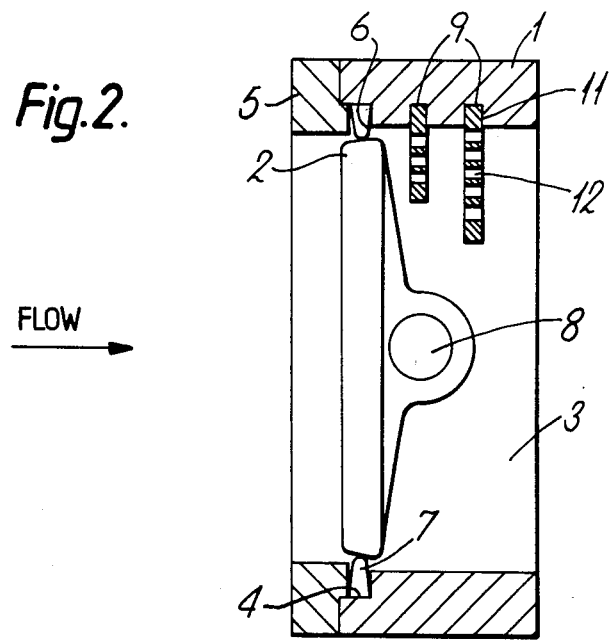

The flap valve shown in FIGS. 1 and 2 comprises a body 1 provided with a flow passage 3 of circular section, into which said body a pivotable closing member or flap 2 is fitted by means of a spindle or pivot shaft 8. The pivot shaft 8 is fitted either in the middle of the flow passage 3 or as displaced off the centre line, and journalled at both sides in the body 1. The flap 2 is fitted at the side of the shaft 8 in the way shown in FIGS. 1 and 2. In the inside face of the flow passage 3 in the body 1, beginning from one end of the body 1, an annular widening 4 has been made, which extends close to the axial line of the valve. Against the bottom of the widening 4, a seal ring 6 is fitted, whose sectional shape may be, e.g., that of a letter U opening towards the bottom of the seal groove 7. The other side of the seal grove 7 is formed by means of a support ring 5, which is fitted in the widening 4 in the flow passage 3 in the way shown by FIGS. 1 and 2. In detail, the basic construction of the flap valve shown in FIGS. 1 and 2 may be, e.g., similar to that described in the Finnish Pat. No. 54,536.

In the embodiment of FIGS. 1 and 2, in which the invention is applied to a reduction in the dynamic moment caused by the flow and acting upon the flap 2, in the flow passage 3 in the body, at the outlet side of the flow from the flap 2, two perforated attenuation plates 9 are fixed. Of course, there may be one or more attenuation plates 9, and they may be located in a desired relationship in respect of each other and of the flap 2. The attenuation plates 9 are placed in the flow passage 3 so that they do no obstruct the movement of the flap 2 between the open and closed positions, i.e. the attenuation plates 9 are placed within the portion of the flow passage 3, divided by the pivot shaft 8, in which, on opening of the valve, the edge face of the closing member or flap 2 is turned upstream, and they are placed in the direction of the pivot shaft 8 symmetrically relative the central height of the flow passage 3. In the case of FIGS. 1 and 2, the attenuation plates 9 are parallel to the flap 2 when the flap 2 is in the closed position, and they are placed at a distance from the flap 2 and from each other. Of course, the attenuation plates 9 do not have to be parallel to the flap 2 or to each other, but they may equally well be installed in a desired diagonal position so as to form an angle relative each other and/or relative the flap. Nor do the attenuation plates 9 have to be straight plane plates.

Figure 3A:
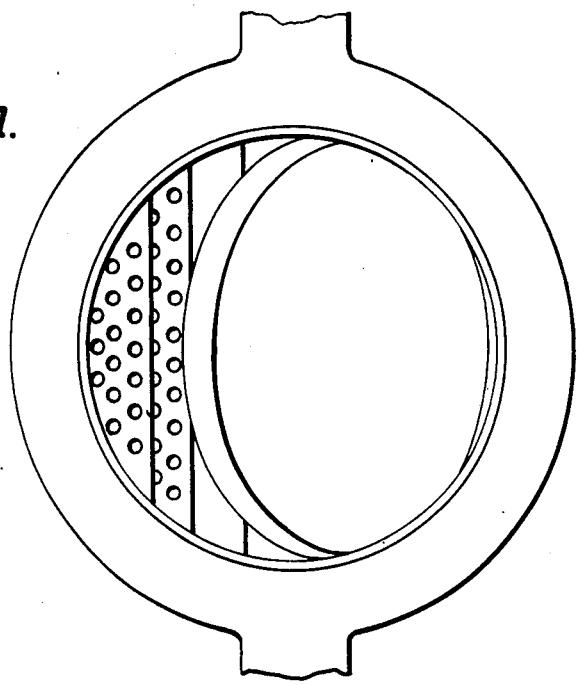
FIGS. 3a–3c show the general shape and location of the attenuation plates in accordance with several embodiments of the invention in the valve body.
Figure 3B:
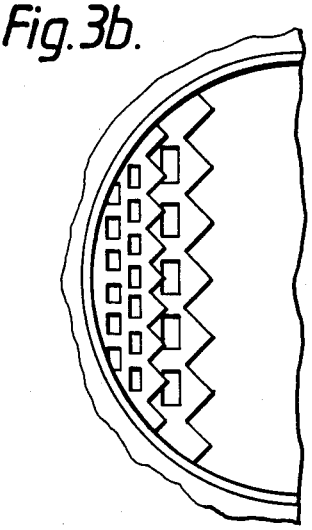

In the embodiment of FIGS. 1 and 2, the attenuation plates 9 form segments of a circle when viewed in the direction of the flow passage 3, FIG. 3a, but the shape of the edge defining the free flow section on the plates may also be different, for example curved, convex or serrate, FIGS. 3b, 3b. In FIGS. 1 and 2, the attenuation plates 9 are placed in a groove 11 machined into the body 1, and attached to the body by welding, but, of course, fixing of the plates in some other way is also possible. For example, the serrate edge face shown in FIG. 3b may be cast directly in the body 1.

In each attenuation plate 9, there are holes 12 or openings passing through the plate, distributed over the area of the whole plate. If there are several attenuation plates 9 side by side in a valve, it is preferable that in two adjoining attenuation plates 9 the holes 12 or openings do not face each other. Most appropriately, the total area of openings of the holes 12 or openings is increased plate by plate when moving away from the flap 2.

Figure 4A:
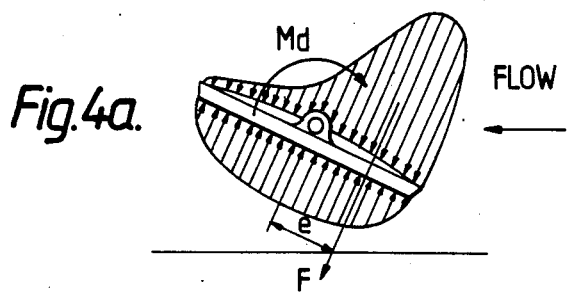
FIG. 4a shows the distribution of pressure on the face of the closing member, i.e. flap, in a conventional valve.
Figure 4B:
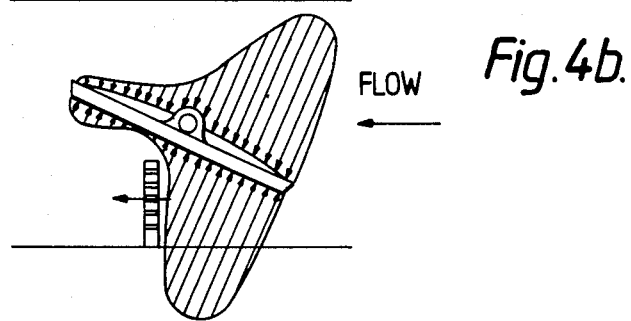
FIG. 4b shows the distribution of pressure on the face of the closing member, i.e. flap, in a valve in accordance with the invention.
Figure 5:
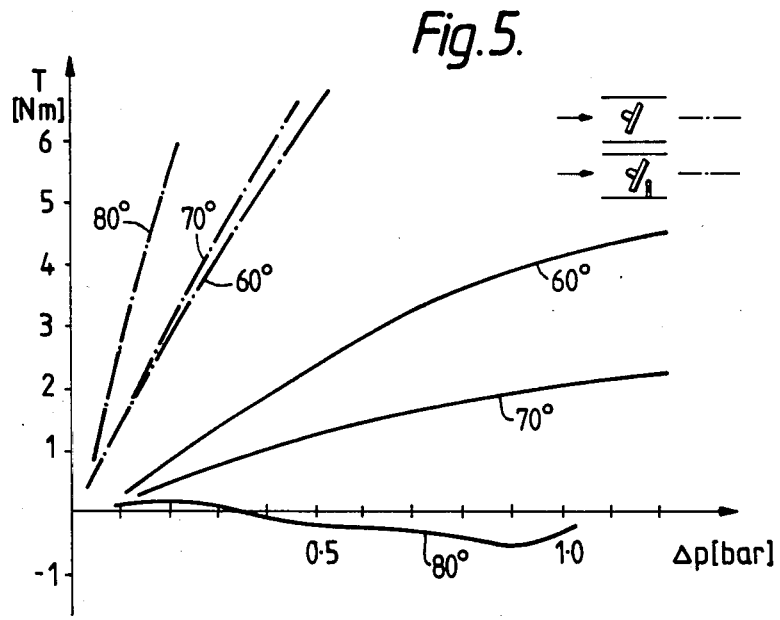
FIG. 5 shows the results of a measurement concerning the magnitude of the dynamic moment in a conventional flap valve and in a valve in accordance with the invention.

When a valve in accordance with FIGS. 1 and 2 is being opened, at the beginning the flow is little, and the dynamic moment is also low. The more the valve is opened, the higher becomes the flow, and a stagnation point and a moment tending to close the flap are produced at the side of the inlet edge. At the trailing side of the inlet edge of the flap, the attenuation plates 9 in the body change the direction of the flow, and a pressure concentration is produced between the faces of the inlet side of the plates 9 and the face of the trailing side of the flap, which pressure tends to open the flap and thereby reduces the effect of the dynamic moment of the flap. In FIG. 4a, this occurrence is illustrated in a conventional valve, and in FIG. 4b the occurrence is illustrated in a valve in accordance with the invention. The effect of the invention is significant. FIG. 5 illustrates the results of a measurement.

It is seen from the figure that when the difference in pressure increases, with an unchanged opening angle, in a conventional construction the dynamic moment increases almost linearly, whereas, in a construction in accordance with the invention, the dynamic moment is, relatively speaking, much lower, and what is remarkable is that the moment curve becomes less steep when the difference in pressure increases. From the results it is also noticed that the higher the opening angle, the more efficiently does the construction reduce the dynamic moment and the load on the actuating device.

Figure 6:
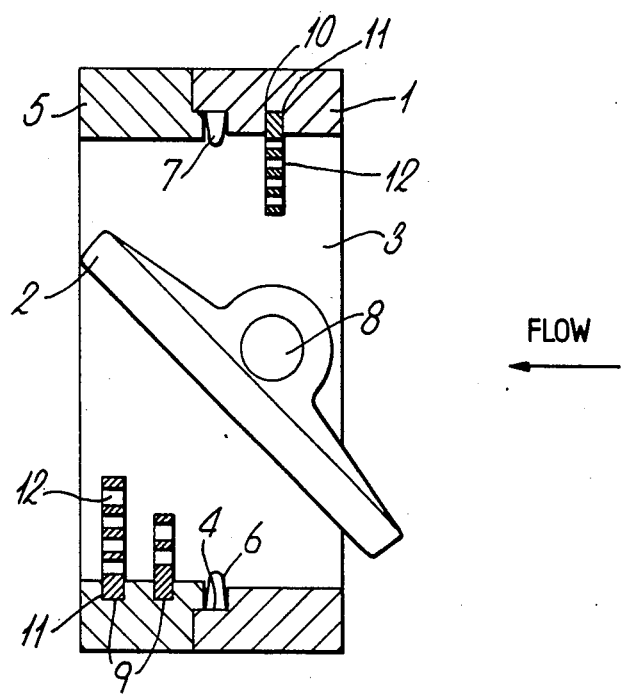
FIG. 6 is a sectional view of a flap valve provided with attenuation of the dynamic moment and of noise viewed in the longitudinal direction of the pivot shaft of the closing member, with the closing member partly opened.
Figure 7:
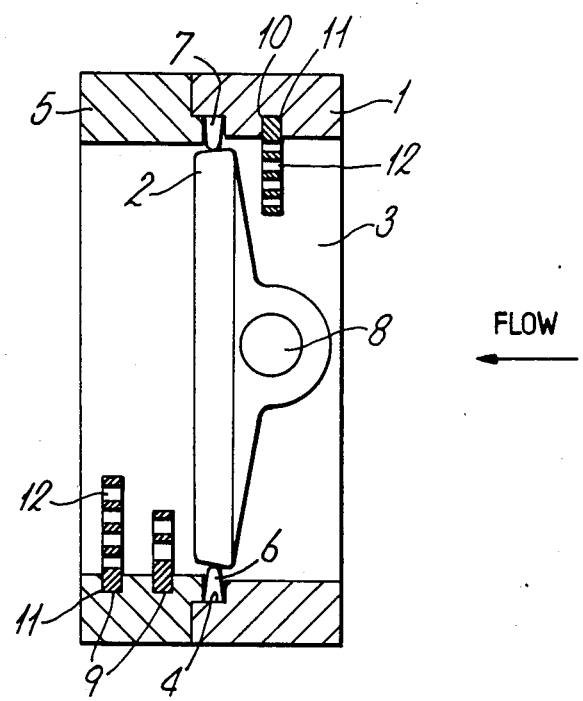
FIG. 7 shows the valve of FIG. 6 when the closing member has been pivoted into the position closing the flow passage in the valve.

A second embodiment of the invention is illustrated in FIGS. 6 and 7. In this illustration, a valve in accordance with FIGS. 1 and 2 is used in the other respects except that the pivot shaft 8 has been shifted so as to be eccentric relative the centre line of the flow passage 3, which said shifting is, however, not essential from the point of view of the operability of the invention.

This embodiment is used in conditions in which the medium tends to cavitate. In this embodiment of the invention, to the embodiment of FIGS. 1 and 2, at the inlet side of the closing member or flap 2, at the side of the trailing edge, attenuation plates 10 have been added within the portion of the flow passage 3, divided by the pivot shaft 8, in which, on opening of the valve, the edge face of the closing member or flap 2 turns downstream, and the said plates 10 are preferably placed in the direction of the pivot shaft 8 symmetrically relative the central height of the flow passage 3. The shape, number and mutual relationship of the attenuation plates 10 may vary in the same way as has been described in relation to FIGS. 1 and 2 regarding the attenuation plates 9. The attenuation properties of the attenuation plates 10 are determined in such a way that they prevent generation of an excessively high flow speed at the trailing edge.

When a valve in accordance with FIGS. 6 and 7 is opened, at the beginning the valve behaves in the same way as that shown in FIGS. 1 and 2. When the opening angle becomes larger, the plates 10 prevent an increase in the flow at the side of the trailing edge so that the corresponding pressure does not become lower than the evaportion pressure of the flowing medium. In this way, no cavitation takes place, and no noise of cavitation is produced. Since the attenuation plates 10 prevent an increase in the flow speed and a reduction in the pressure at the trailing edge, they do not increase the asymmetry of the pressure distribution at the inlet sie of the flap, nor the dynamic moment of the flap. At the side of the inlet edge, the attenuation plates 9 act in the same way as was described in connection with the valve of FIGS. 1 and 2, i.e. they reduce the dynamic moment.

Figure 3C:
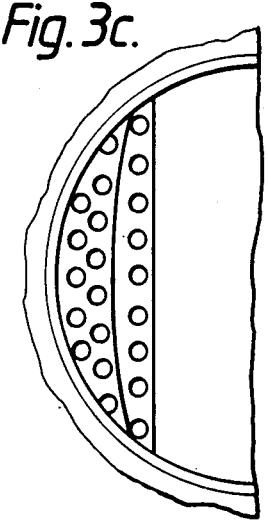
Figure 8:
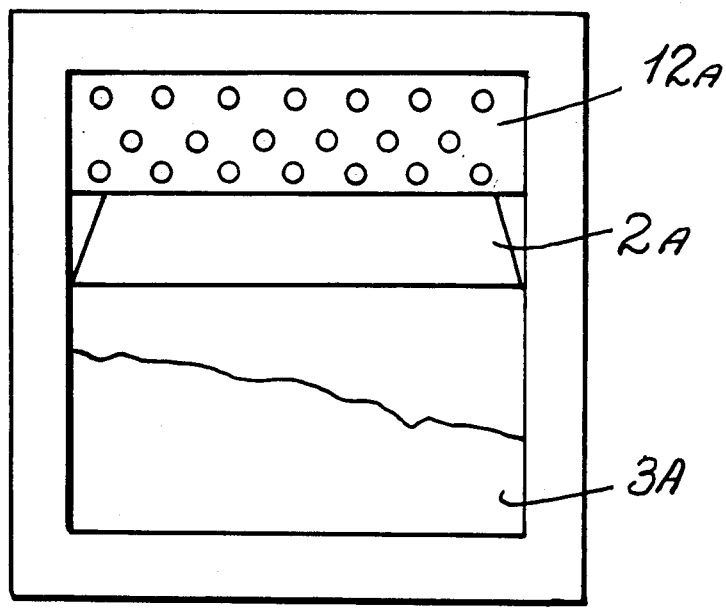
FIG. 8 is a schematic view in elevation of an alternate embodiment of the flap valve of the present invention.

As shown in FIG. 8, the flow passage 3a can be rectangular in section with the attenuation member 12a being also rectangular in shape. It may be convex, curve or serrate in the manner illustrated in FIGS. 3a, 3b or 3c.

What is claimed is:

1. A valve comprising a body provided with a flow passage and a closing member movably mounted in said passage to be pivotable about pivot means between a first position wherein said member blocks flow through said passage and a second position wherein flow through said passage is permitted, sealing means for cooperating with said member when in said first position to seal said passage, said pivot means being disposed in said passage to thereby divide the flow passage between first and second segments, said closing member having a section which is disposed relative to said pivot means so as to pivot in a generally upstream direction when said closing member moves from said first toward said second position, said passage having a portion downstream of said section of said closing member and at least one attenuation member mounted in said downstream portion of said passage and out of flow impeding relation with the remainder of said flow passage.

2. Valve as claimed in claim 1, characterized in that the attenuation member are plates projecting from the wall of the flow passage.

3. The valve as claimed in claim 1 wherein said attenuation member is provided with holes therethrough.

4. Valve as claimed in claim 3, characterized in that the holes in the attenuation member are distributed evenly over the area of the attenuation member.

5. The valve as claimed in claim 1 wherein a plurality of said attenuation members are mounted in said flow passage spaced from one another in said portion of said flow passage with each said attenuation member being provided with several openings.

6. The valve as claimed in claim 5 wherein said closing member is a pivotably mounted plate having a peripheral edge for engaging said sealing means, said plate being symmetrically mounted on said pivot means relative to said flow passage and having another section opposite said first mentioned section with said another section disposed to move in a downstream direction when said closing member moves from said first to said second position.

7. The valve as claimed in claim 3 wherein two attenuation members are provided, each having said openings therethrough and where the openings of the downstream one of said attentuation members are out of alignment with the openings in the upstream one of said attenuation members.

8. The valve as claimed in claim 3 wherein two attenuation members are provided in alignment in said section of said flow passage and the openings of the downstream one of said attenuation members are larger than the openings in the upstream one of said attenuation members.

9. The valve as claimed in claim 3 wherein a plurality of attenuation members are disposed in said flow passage with said attenuation members being spaced from each other and with the hole size in said attenuation members increasing as a said attenuation member is located more remotely from said closing member.

10. The valve as claimed in claim 1 wherein said flow passage is circular and the shape of the attenuation member is a segment of the cross-section of the flow passage and having a free edge which is curved relative to the axis of the flow passage.

11. The valve as claimed in claim 10 wherein said free edge is serrated.

12. The valve as claimed in claim 1 wherein said flow passage is of rectangular cross-section and said attenuation member is rectangular having a free edge, said edge being curved.

* * * * *